(12) United States Patent
Takai et al.

(10) Patent No.: US 9,891,394 B2
(45) Date of Patent: Feb. 13, 2018

(54) TRANSCEIVER MODULE PLUG CONNECTOR

(71) Applicants: YAMAICHI ELECTRONICS CO., LTD., Tokyo (JP); HITACHI METALS, LTD., Tokyo (JP)

(72) Inventors: Yosuke Takai, Sakura (JP); Toshiyasu Ito, Togane (JP); Yoshinori Sunaga, Hitachinaka (JP); Izumi Fukasaku, Hitachi (JP); Kinya Yamazaki, Hitachi (JP)

(73) Assignees: YAMAICHI ELECTRONICS CO., LTD., Tokyo (JP); HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/175,095

(22) Filed: Jun. 7, 2016

(65) Prior Publication Data

US 2016/0365653 A1 Dec. 15, 2016

(30) Foreign Application Priority Data

Jun. 9, 2015 (JP) ................................. 2015-116659

(51) Int. Cl.
| | | |
|---|---|---|
| *H01R 12/73* | (2011.01) | |
| *G02B 6/42* | (2006.01) | |
| *H01R 12/72* | (2011.01) | |
| *H01R 12/87* | (2011.01) | |
| *H01R 12/51* | (2011.01) | |

(52) U.S. Cl.
CPC ......... *G02B 6/4246* (2013.01); *G02B 6/4284* (2013.01); *H01R 12/51* (2013.01); *H01R 12/721* (2013.01); *H01R 12/73* (2013.01); *H01R 12/87* (2013.01)

(58) Field of Classification Search
CPC ......... H01R 12/73; H01R 12/51; H01R 12/87
USPC ........................................ 439/637, 260, 377
See application file for complete search history.

(56) References Cited

U.S. PATENT DOCUMENTS

| | | | | |
|---|---|---|---|---|
| 8,075,343 B2* | 12/2011 | Fu | ........................ | H01R 12/732 439/328 |
| 8,714,839 B2* | 5/2014 | Ito | ........................ | H05K 9/0018 385/139 |
| 2013/0084754 A1* | 4/2013 | Mason | ................. | H01R 12/716 439/637 |

* cited by examiner

*Primary Examiner* — Abdullah Riyami
*Assistant Examiner* — Justin Kratt
(74) *Attorney, Agent, or Firm* — Oliff PLC

(57) ABSTRACT

In a transceiver module, where one end of a module substrate is inserted and connected to a concave portion of a plug connector and when one end face of the module substrate is touched to the inner periphery face forming the concave portion, a projection portion formed at the periphery of the concave portion of the plug connector is fitted to a notch portion of the module substrate.

4 Claims, 6 Drawing Sheets

TRANSCEIVER MODULE PLUG CONNECTOR

CROSS-REFERENCES TO RELATED APPLICATIONS

This application claims the benefit of Japanese Patent Application No. 2015-116659, filed Jun. 9, 2015, which is hereby incorporated by reference herein in its entirety.

BACKGROUND OF THE INVENTION

Field of the Invention

The present invention relates to a transceiver module plug connector.

Description of the Related Art

In an optical communication system, a transceiver module has been in practical use in order to transmit an optical signal transmitted through optical fibers, a copper cable, and an optical connector or the like to a mother board. The optical communication system has, at the operation-side end face of the housing, transceiver module assemblies that are provided so as to protrude ends of optical modules as transceiver modules of a plurality of transceiver module assemblies, respectively. The transceiver module assembly is configured to include an optical module and an optical module receptacle assembly as disclosed in U.S. Pat. No. 8,714,839 for example. The optical module is configured to mainly include a metal-made upper case and a lower plate forming a contour unit and a module substrate positioned at a predetermined position in a storage space formed between the upper case and the lower plate.

One end of the module substrate is, as shown in FIGS. 6A and 6B in U.S. Pat. No. 8,714,839, connected to a plug connector having an electrode portion. The electrode portion of the plug connector has a right face and a back face that have a plurality of contact pads arranged to be parallel to one another on a common plane with a predetermined interval, respectively. Both sides of one end of a module substrate are position-regulated with regard to the plug connector, respectively, by being inserted and fixed to guide units formed at both side faces of the plug connector. Both side faces connected to the guide unit of the plug connector have nibs, respectively. The respective nibs are fixed to the periphery of a groove in the substrate support wall of the upper case.

In recent years, it has been desired to provide transceiver modules in a housing of an optical communication system while the maximum number of transceiver modules are arranged on the entire operation-side end face of the housing of the optical communication system.

SUMMARY OF THE INVENTION

However, arranging transceiver modules of the same model to form one lateral line on the operation-side end face of the housing of the optical communication system has limitations in the number of transceiver modules that can be arranged because the housing has a limited width size at a predetermined length in the direction along which the transceiver modules are arranged on the operation-side end face.

In such a case, a configuration also may be considered in which the number of transceiver modules that can be arranged is increased by reducing the width size along the above-described arrangement direction in the transceiver module. However, the downsizing of the transceiver module is not easy in the case of the structure as described above in which both sides of one end of the module substrate are position-regulated by being inserted and fixed to guide units formed at both side faces of the plug connector, respectively.

In view of the above-described problem, the present invention aims to provide a transceiver module plug connector. The transceiver module plug connector can reduce the width size of a transceiver module assembly in the arrangement direction of a plurality of transceiver modules.

To achieve the above-described object, the transceiver module plug connector according to the present invention comprises: a connection end having therein a concave portion forming an opening to which one end of a module substrate is inserted; a plurality of contact terminals that are provided on the outer periphery face of the connection end and that are connected to an electrode portion of a. module substrate; and a positioning portion that is formed in the concave portion of the connection end and that is engaged with a portion to be engaged of one end of a module substrate to thereby position a contact terminal to an electrode portion of a module substrate. The positioning portion may be a projection portion fitted to a notch portion formed in the one end of the module substrate inserted to the concave portion. In addition, the positioning portion may be an opening fitted with a projection portion formed in the one end of the module substrate inserted to the concave portion.

The connection end may have a pair of chamfered portions provided at the tip end side than an end of the contact terminal.

According to the transceiver module plug connector of the present invention, the positioning portion is formed in the concave portion of the connection end and is engaged with the portion to be engaged of the one end of the module substrate, thereby positioning the contact terminal to the electrode portion of the module substrate. Because this is in no need of a guide unit used in a conventional structure, the transceiver module assembly can have a reduced width size along the arrangement direction in a plurality of transceiver modules.

Further features of the present invention will become apparent from the following description of exemplary embodiments (with reference to the attached drawings).

DESCRIPTION OF THE EMBODIMENTS

Figure 2:
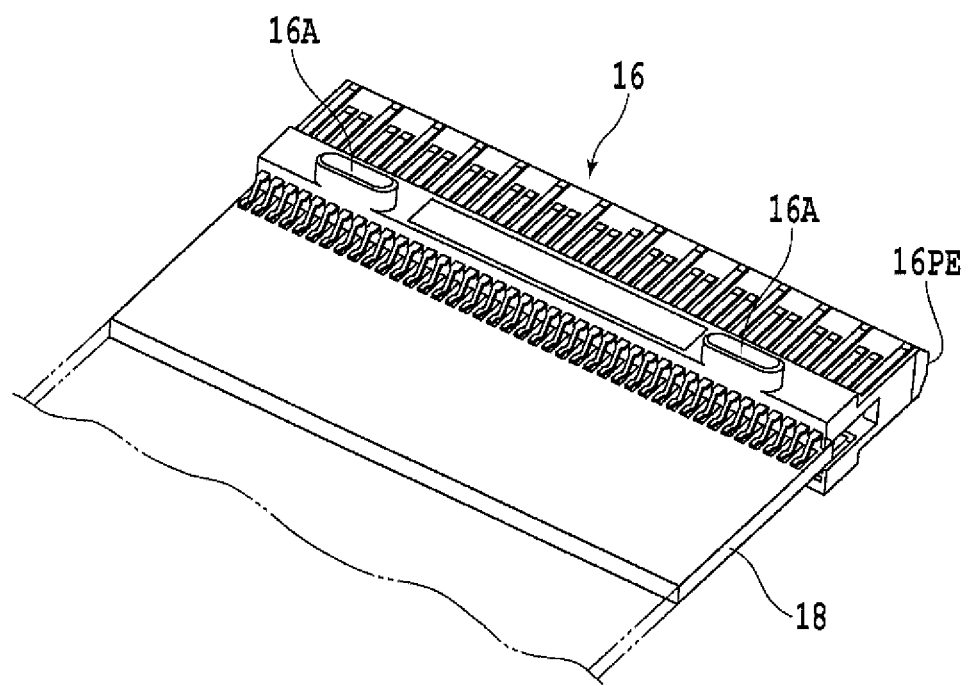
FIG. 2 is an enlarged perspective view illustrating one example of the transceiver module plug connector according to the present invention together with a module substrate connected thereto.

FIG. 2 illustrates one example of a transceiver module plug connector according to the present invention together with one end of a module substrate.

An optical module as an example of a transceiver module is configured, for example, to comprise a metal upper case and a lower plate (not shown) forming a contour unit and a module substrate 18 and a plug connector 16 (see FIG. 2) positioned at a predetermined position in a storage space formed between the upper case and the lower plate as main elements. The upper case and the lower plate have, at the other end faces thereof, a plurality of ports connected to optical connectors.

Figure 1:
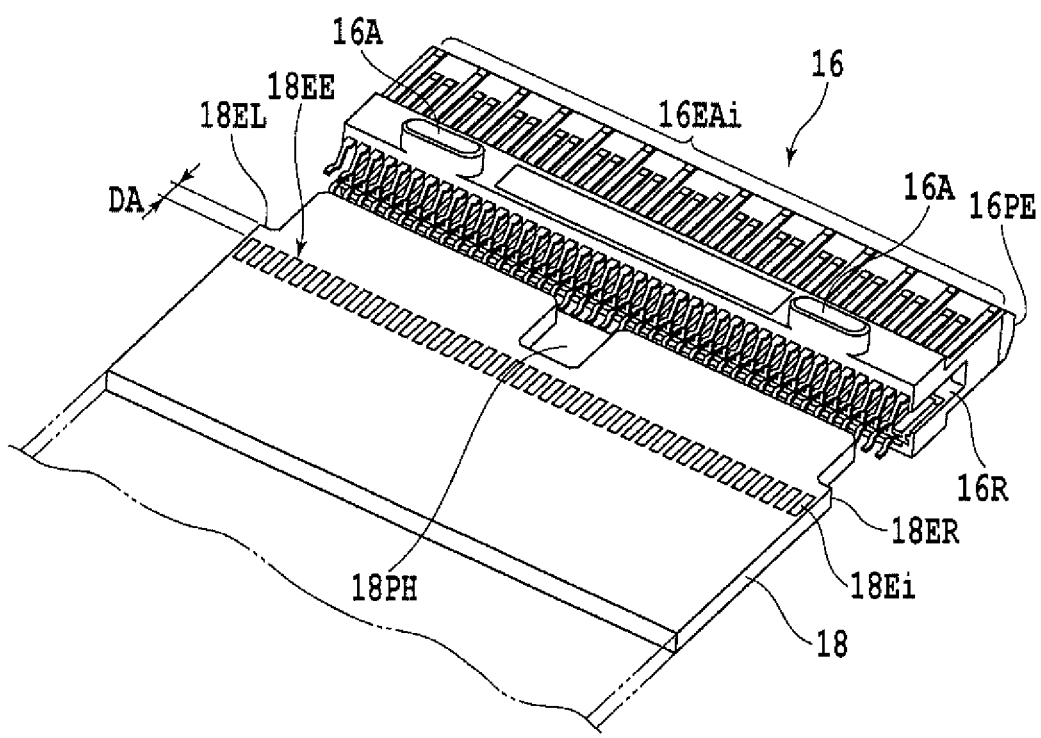
FIG. 1 is an enlarged perspective view illustrating one example of a transceiver module plug connector according to the present invention together with a module substrate.

As shown in the enlarged view of FIG. 2, one end as a connection end of the module substrate 18 is inserted and connected to the inner side of the plug connector 16. A substantially-center part in the one end of the module substrate 18 has, as shown in the enlarged view of FIG. 1, a notch portion (groove portion) as a positioning portion to the plug connector 16 of the module substrate 18. An opening end of a notch portion 18PH is opposed to a positioning portion 16PP in the plug connector 16 (which will be described later) and penetrates through the one end of the module substrate 18. At both sides in the one end of the module substrate 18, clearances 18ER and 18EL are formed, respectively. At a position away from the closed end of the notch portion 18PH of the module substrate 18 by a predetermined distance DA, electrode portions 18EE that consist of a plurality of contact pads 18Ei (i=1~n, n is a positive integer) and that are opposed to the right face and the back face. The contact pads 18Ei are arranged to form one line in a direction substantially orthogonal to the insertion direction to the plug connector 16 of the module substrate 18 with a predetermined interval (e.g., 0.5 mm interval).

The plug connector 16 is integrally formed by resin material for example. As shown in the enlarged view in FIG. 1, the plug connector 16 is configured to comprise a connection end 16PE, a substrate support portion that is continued to the connection end 16PE and that supports one end of the module substrate 18, and a plurality of contact terminals 16EAi and 16EBi (i=1~n, n is a positive integer) supported by the connection end 16PE and the substrate support portion.

Figure 3:
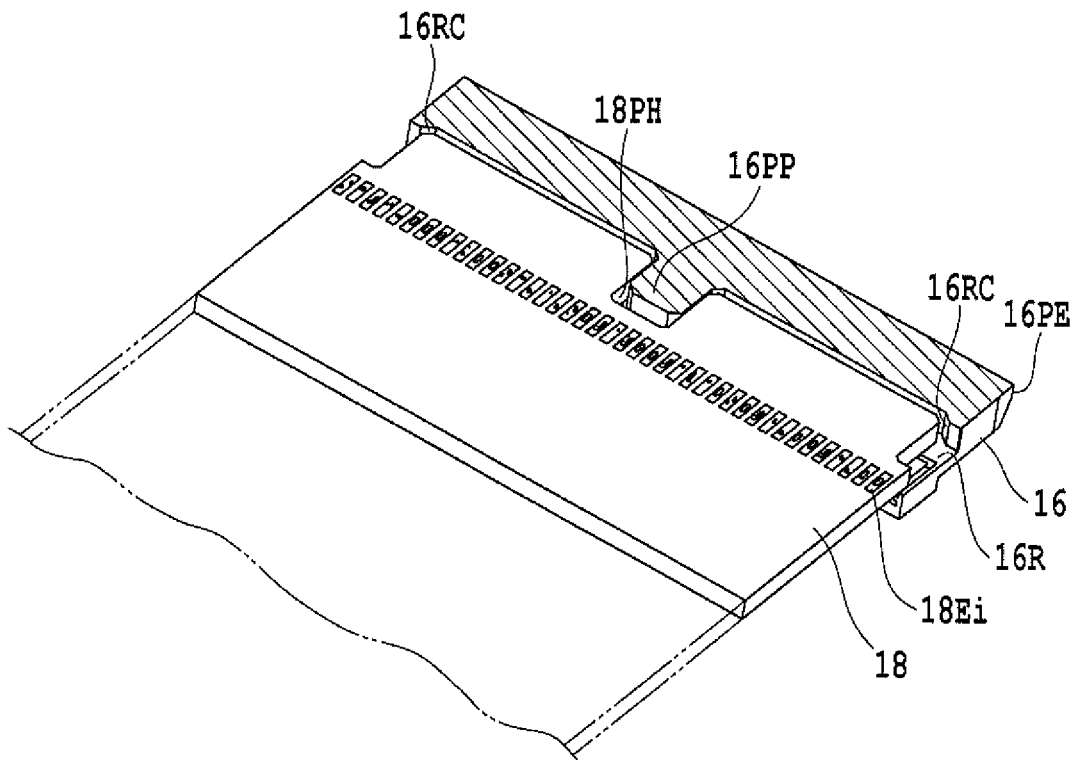
FIG. 3 is a cross-sectional view illustrating the example shown in FIG. 2.
Figure 6:
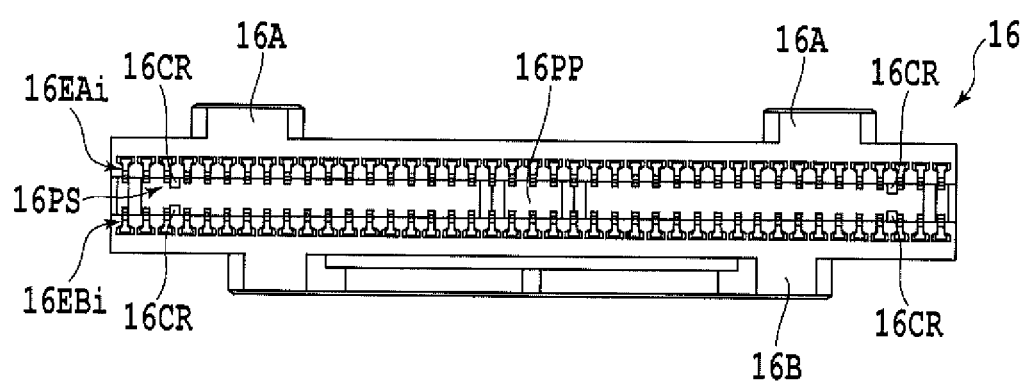
FIG. 6 is a rearview illustrating the example shown in FIG. 4.

The connection end 16PE is protruded from the opening ends of the upper case and the lower plate for example and is inserted to the slot of a host connector constituting a not-shown transceiver module receptacle assembly. As shown in the enlarged view of FIG. 3, the connection end 16PE has therein a concave portion 16R to which the one end of the above-described module substrate 18 is inserted. As shown in FIG. 6, the concave portion 16R communicates with the opening end 16PS of the substrate support portion. Both sides in the concave portion 16R are outwardly opened. At a closed end forming a part of the concave portion 16R, the positioning portion 16PP is formed at a substantially center position corresponding to the notch portion 18PH of the module substrate 18. The positioning portion 16PP and the notch portion 18PH as a positioning portion are set in advance so that the respective contact terminals 16EAi and 16EBi correspond to the predetermined contact pad 18Ei. As shown in FIG. 6, crush ribs 16CR are formed at a position away from the positioning portion 16PP in a lateral direction in the concave portion 16R in order to pinch and position the ends of the module substrate 18 so as maintain the posture of the module substrate 18 to be parallel to the upper face of the connection end 16PE.

Figure 4:
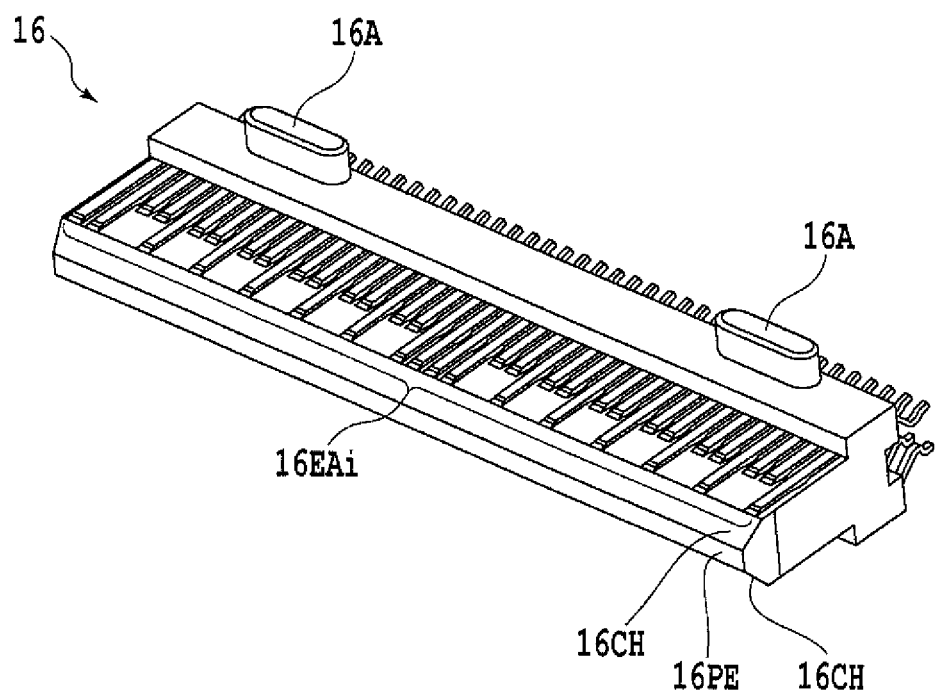
FIG. 4 is a perspective view illustrating the appearance of one example of the transceiver module plug connector according to the present invention when seen from above.

Both side faces of the connection end 16PE are placed on a plane common to both side faces of the module substrate 18, respectively. The connection end 16PE has, at the tip end of the outer periphery thereof, as shown in the enlarged view of FIG. 4 and FIG. 5, a pair of chamfers 16CH are formed along the arrangement direction of the contact terminals 16EAi and 16EBi from one side face to the other side face, the pair of chamfers 16CH functioning as a guide for the plug connector 16 into the slot of the above-described host connector. The chamfer 16CH is set to have about C0.5 for example. A predetermined chamfer smaller than the chamfer 16CH is provided at at both side faces at the outer periphery of the connection end 16PE. This allows the tip end of the connection end 16PE to have a substantially acute arch-like cross sectional shape. Thus, because there is no need to form a chamfered portion for leading the plug connector 16 at the periphery of the slot of the host connector, this allow the dimension of the plug connector 16 in the host connector along the attachment/detachment direction to be reduced correspondingly.

Figure 5:
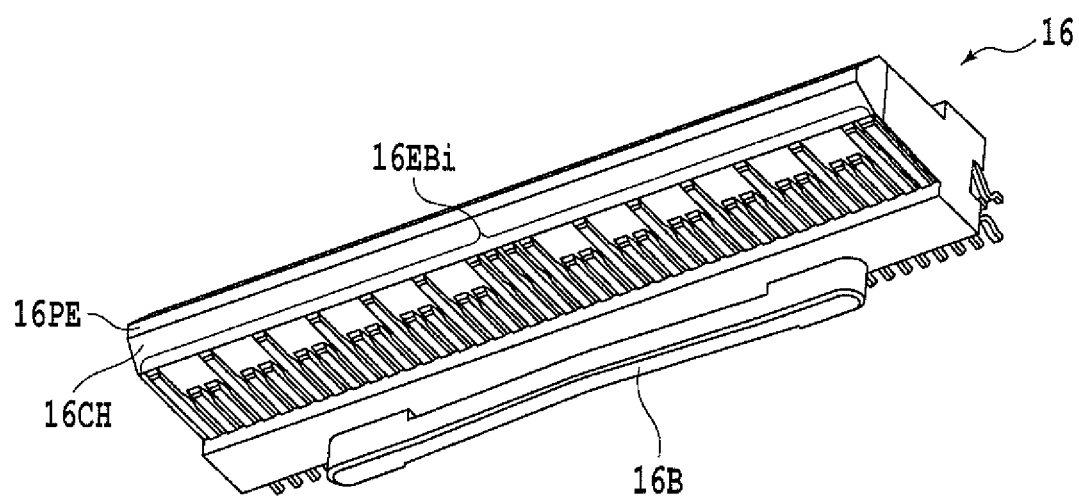
FIG. 5 is a perspective view illustrating the appearance of one example of the transceiver module plug connector according to the present invention when seen from below.

As shown in the enlarged view of FIG. 6, the substrate support portion of the plug connector 16 has an opening end 16PS through which one end of an inserted module substrate 18 passes. A pair of positioning portions 16A which are touched to a substrate support wall (not shown) in the upper case and the lower plate are formed to be away from each other on the upper face of the substrate support portion. As shown in FIG. 5 and FIG. 6, an elongated spring portion 16B which is touched to a substrate support wall (not shown) in the upper case and the lower plate is formed on the lower face of the substrate support portion.

The contact terminal 16EAi is placed on the upper face of the connection end 16PE opposed to a pair of positioning portions 16A of the substrate support portion with a predetermined interval corresponding to the above-described the contact pad 18Ei. The contact terminal 16EAi is composed, for example, of a power source terminal, a signal contact terminal, and a grounding contact terminal. For example, a pair of neighboring signal contact terminals are placed between grounding contact terminals. The contact terminal 16EAi has a fixed terminal portion soldered and fixed to the contact pad 18Ei and a contact portion touched to a contact portion of a contact terminal of a host connector.

The contact terminal 16EBi is placed on the lower face of the connection end 16PE opposed to the spring portion 16B of the substrate support portion to have a predetermined interval corresponding to the above-described contact pad 18Ei. The contact terminal 16EBi is composed of a power source terminal, a signal contact terminal, and a grounding contact terminal for example. For example, a pair of neighboring signal contact terminals are placed between grounding contact terminals. The contact terminal 16EBi has a fixed terminal portion soldered and fixed to the contact pad 18Ei and a contact portion touched to a contact portion of a contact terminal of a host connector.

In the configuration as described above, as shown in the enlarged view of FIG. 3, where one end of the module substrate 18 is inserted and connected to the concave portion 16R of the plug connector 16 and when one end face of the module substrate 18 is touched to the inner periphery face forming the concave portion 16R, the positioning portion 16PP formed at the periphery of the concave portion 16R of the plug connector 16 is fitted to the notch portion 18PH. At that time, both ends of the one end face of the module substrate 18 are engaged with the circular arc portion 16RC of the concave portion 16R. Hereby, the contact terminals 16EAi and 16EBi are positioned to the respective contact pads 18Ei of the module substrate 18. Thus, because the module substrate 18 is in no need of a guide portion conventionally used in the structure of a plug connecter, this can result in a reduced width size along the arrangement direction of the contact terminals 16EAi and 16EBi in the plug connector.

In the above-described example, a notch portion (groove portion) 18PH is formed as a positioning portion to the plug connector 16 of the module substrate 18 and the projection portion 16PP is formed at the periphery of the concave portion 16R of the plug connector 16. However, the present invention is not limited to such an example. For example, a projection portion may be formed as a positioning portion to the plug connector 16 of the module substrate 18 and an opening may be formed whose the projection portion is fitted to the periphery of the concave portion 16R of the plug connector 16.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A transceiver module plug connector comprising:
   a connection end having therein a concave portion forming an opening to which one end of a module substrate is inserted;
   a plurality of contact terminals that are provided on the outer periphery face of the connection end and that are connected to an electrode portion of the module substrate;
   a positioning portion that is formed in the concave portion of the connection end and that is engaged with a portion of one end face of the module substrate to thereby position the contact terminals to the electrode portion of the module substrate, and
   wherein, both sides in the concave portion are outwardly opened and both sides in the one end face of the module substrate are not covered with the connection end, and
   wherein both ends of the one end face of the module substrate are engaged with a circular arc portion of the concave portion and the width of the one end face of the module substrate is narrower than that of the electrode portion of the module substrate.

2. The transceiver module plug connector according to claim 1, wherein the positioning portion is a projection portion fitted to a notch portion formed at the one end face of a module substrate inserted into the concave portion.

3. The transceiver module plug connector according to claim 1, wherein the positioning portion is an opening fitted to a projection portion formed at the one end face of a module substrate inserted to the concave portion.

4. The transceiver module plug connector according to claim 1, wherein the connection end has a pair of chamfered portions provided at the tip end of the outer periphery of the connection end.

* * * * *